United States Patent [19]

Brendel

[11] 4,183,889
[45] Jan. 15, 1980

[54] METHOD FOR THE PRODUCTION OF A POLYMER SUBSTRATE WITH A FIBROUS SURFACE

[75] Inventor: Hugo Brendel, Memmingen, Fed. Rep. of Germany

[73] Assignee: Metzeler Schaum GmbH, Memmingen, Fed. Rep. of Germany

[21] Appl. No.: 868,119

[22] Filed: Jan. 9, 1978

Related U.S. Application Data

[63] Continuation of Ser. No. 667,621, Mar. 17, 1976, abandoned.

[30] Foreign Application Priority Data

Mar. 22, 1975 [DE] Fed. Rep. of Germany ....... 2512772

[51] Int. Cl.$^2$ ............................ B29C 17/00; B29F 5/00
[52] U.S. Cl. ........................................ 264/134; 264/164
[58] Field of Search ................................ 264/164, 134

[56] References Cited

U.S. PATENT DOCUMENTS

| | | | |
|---|---|---|---|
| 3,390,403 | 6/1968 | Van Tilburg | 264/284 |
| 3,708,565 | 1/1973 | Seiffert | 264/284 |
| 3,814,791 | 6/1974 | Jones | 264/164 |
| 3,860,370 | 1/1975 | Fanto-Kuertoes | 264/164 |
| 3,976,820 | 8/1976 | Giovanelli | 264/280 |
| 3,983,278 | 9/1976 | Wardle | 264/322 |

FOREIGN PATENT DOCUMENTS 1139165 1/1969 United Kingdom ...................... 264/164
1378638 12/1974 United Kingdom ...................... 264/164

OTHER PUBLICATIONS

Anon, Mod. Plastics Encyclopedia, 1966, McGraw-Hill, N.Y., p. 265.
Floyd, Polyamide Resins, Reinhold, N.Y. (1958), pp. 11 & 41.

*Primary Examiner*—W. E. Hoag
*Attorney, Agent, or Firm*—Armstrong, Nikaido, Marmelstein & Kubovcik

[57] ABSTRACT

The present invention relates to a process for the production of thermoplastic substrate with fibrous surfaces. The fibers of these surfaces are formed by drawing away from a heated surface a molten polymer component backed by an unmelted polymer residue layer or substate. Simultaneous with the drawing, the nascent fibers are stabilized by cooling. For this purpose, cooling media are introduced in the fiber-forming zone. The thermoplastic polymer compounds should be applied in a thickness of at least 50 microns, and preferably 150 microns (when only 1 polymer forms the molten component), on a heated drawing surface of a drum or a conveyor belt apparatus.

This invention relates to the production of fibrous surfaces on polymer substrates. Typically the substrates are in the form of webs. The use of webs makes the cooling process more efficient.

11 Claims, 3 Drawing Figures

METHOD FOR THE PRODUCTION OF A POLYMER SUBSTRATE WITH A FIBROUS SURFACE

This is a continuation of application Ser. No. 667,621, filed Mar. 17, 1976 now abandoned.

BACKGROUND OF THE INVENTION

A process for the production of sheet products with fibrous surfaces has been known in the prior art in which the sheet products are composed of a substrate which is covered with a thermoplastic fiber nap. The substrate acts as a carrier. This process presses polymer foils on a heated drum until they begin to melt. As the molten polymer foils adhere to the drum and to the substrate, the substrate is drawn off with a simultaneous cooling of the molten film. Following this drawing process, a plurality of uniform fibers are formed from the molten polymer. These fibers adhere to the substrate. This process produces surfaces which have textures of velour, plush or pelt (see, for example, U.S. Pat. No. 3,708,565.)

The prior art required a polymer-unrelated substrate made out of textile fabric, paper or fleece. However, as many enterprises required plastic webs or films with fibrous outer surfaces with substrates which consisted totally of polymeric materials. It is desirable that a substrate be produced out of fiber naps in which the fibers combine the positive properties of several polymers which have been amalgamated within the fiber. Alternatively, it is desirable that the fibers should consist of another polymer, similar to the substrate.

SUMMARY OF THE INVENTION

An object of this invention is to provide a process for the production of a polymer substrate with a fibrous surface. This process comprises a process for producing polymer substrates having fibrous surfaces comprising the steps of providing a film comprising a polymer of lower melting point upon a polymer of higher melting point; drawing the polymers past a drawing surface and through a melting zone; heating the polymers in the melting zone until the polymer of lower melting point becomes a molten component, whereby the polymer which has a higher melting point is covered with a film of the molten component; and deflecting the polymer of higher melting point, which is covered with said film, from the drawing surface and the melting zone while simultaneously cooling the molten component whereby fibers are formed which are strongly bound to the surface of the polymer with the higher melting point. Previous to this invention, processes which involved the use of calendars or extrusion were known in the prior art, but were characterized by the great difficulty or the impossibility of amalgamating or compounding polymers.

DETAILED DESCRIPTION OF THE INVENTION

According to the process of this invention, a polymer film with a thickness of at least 50 microns, and preferably 150 microns, is applied to a heated drawing surface upon which the film will cling until melted. The molten part of the film will then cover the unmelted film or substrate. The unmelted substrate may be half of the total film thickness. For example, if a thickness of 50 microns is used, then not more than ⅔ of the polymer (30 microns) is to be melted. Otherwise there is too great a risk of breaking or tearing the film as it is being drawn away from the heated drawing surface. Following melting, the nascent fibers are drawn away from the drawing surface and stabilized under simultaneous cooling. As a result, the melted part of the film is detached from the heated surface thus commencing formation of a fiber nap an pile. The unmelted part of the film is the substrate for the newly formed fiber nap. This fiber nap adheres very strongly to the proximate surface of the substrate.

Also this invention offers a possibility of making the film as a composite with 2 or more different polymers layered upon a substrate consisting of another polymer. These films are made by using polymers with distinctive melting points and/or melting viscosities. The total thickness of the combined polymers within the foils should be at least 50 microns, and preferably 100 microns. The composite film is then applied to the heated drawing surface. In the composite film, a polymer with the lowest melting point and/or lowest melting viscosity is deposited so that it will be closest to the heated drawing surface. This invention provides for a uniform mixture of fibers by mixing the molten polymers. Following the melting of the film, intimate mixing is assisted by the shearing stress which is formed between the unmelted substrate and the heated drawing surface.

This invention can be further modified such that two or more films of different polymers are applied successively on the drawing surface, rather than simultaneously. Still further, this invention makes it possible to draw one of two or more different layered polymers, which comprise the composite film, upon the heated drawing surface, and then to melt and pull the layer away from the heated drawing surface causing the formation of homogeneous or heterogeneous fiber naps which adhere on the unmelted film substrate.

This modification of the invention makes possible very simple operations for the production of polymer substrates with fibrous surfaces. Of all the horizontal polymer layers present, the fibers are formed only out of the melted polymer layer which is, for example, proximate to the heated drawing surface.

Amother modification provides for the addition of polymers in the form of particulate matter, such as granules or powder, upon the polymer substrate.

An essential characteristic of the invention is that the nascent fibers are cooled until they are hardened, stabilized and solidified. The invention provides for cooling which operates within the drawing angle, which is between the unmelted film residue which forms the substrate and the drawing surface. Air cooling is preferable. It may be advantageous to conduct secondary cooling of the substrate on the back side which is opposite the side to which the fibers adhere. Also with secondary cooling, one can prevent single or combined films from completely melting through. The cooling may, indeed, take place along with all of the steps of feeding the film, or it may take place only in a single zone.

Polymers which have in the molten state a low viscosity are suitable as a meltable thermoplastic film and/or as components of a composite film and as the substrate include, inter alia: polyethylene having a MFI 190/2 of 10–300 grams/10 minutes; ethylene/vinyl acetate having a MFI 190/2 above 10 grams/10 minutes; polypropylene having a MFI 190/5 of 10–70 grams/10 minutes; polymethylmethacrylate having a MFI 210/10 above 10 grams/10 minutes; cellulose acetate, cellulose acetate-butyrate, and cellulose propionate, CA, CAB, CP having at MFI 190/2 about 8; polyoxymethylene having a MFI 190/2 above 13 grams 10 minutes; polyvinyl chloride/acetate having a K value below 60 and containing at least 15% plasticizer; polyamide 6 having a relative viscosity between 2.1 and 3.4 polyamide 12 having a relative viscosity between 1.7 and 21.1; and polyethyleneterephthalate having a relative viscosity above 1.6; and soft polyvinyl chloride.

Polyvinyl chloride is preferred as the molten component. The following considerations, inter alia, govern the selection of polymers:

A low melt viscosity improves the adhesion so that much more fiber nuclei are formed than in the case of a high melt viscosity.

A molten material at a high temperature results in a lower melt viscosity so that the fiber-drawing time is prolonged, and this prolongation provides for a longer time in which measures to control the process can be carried into effect.

The mechanism of the fiber forming process of the invention is that the forces of cohesion in the polymer cause the solidified fibers to visibly constrict near their point of contact with the heatable drawing surface causing tearing and breaking apart at a distance from the drawing surface. The distance traveled by the carrier prior to deflection depends on the curvature of the heatable drawing surface. Within the scope of the invention, the distance traveled may amount to between a few millimeters and some centimeters, preferably between 5 and 50 millimeters and up to an upper limit of about 100 millimeters. As a result of the deflection of the substrate, the root portion of the fiber is withdrawn from the intense action of the flowing molten fluid so that this portion is extended to a smaller thickness and a longitudinal molecular orientation is imparted to the fibers before the tips of the fibers are torn from the heated drawing surface near their upper ends.

It has been found to be necessary to provide for a proportionality or approximately proportionality between the solidification rate of the polymer and of the fibers' temperature. Thus, if the solidification is too rapid, the molten polymer is torn apart only as coarse fibers so that flakes rather than the desired fibers would be formed from molten material of high viscosity, whereas only thin filaments having bulblike roots could be pulled from molten polycondensates of low viscosity.

For this reason, the process of the invertion is applied primarily to polymerization products which have a low molecular weight and, correspondingly, a high melt index.

On the other hand, the use of highly crystalline high polymers, particularly of polycondensates of such polymers, is rendered difficult by the high crystallization rate. It has thus proved desirable to use such high polymers in the form of copolymers or in polyblends together with other polymers so that the tendency to crystallize is reduced and the solidification range is increased. For instance, pure polyoxymethylene (POM) when used alone results in thin and brittle fibers but, in admixture with 10% by weight low density polyethylene, it can be used to produce a useful product having a catskinlike feel or hand. An admixture of polyamides from POM also improves the fiber-forming process. On the other hand, pure Polyamide 6 (PA 6) when used alone results in thin fibers which look like cotton-wool. If this material is copolymerized with Polyamide 66 (PA 66) or with ethylene or is mixed with 12% by weight polymethylmethacrylate of low viscosity, a fabric-like textile plush can be produced. Mixtures of Polyamide 6 (PA 6) with Polyamide 11 (PA 11) or PA 12 or PA 6.10 exhibit a wider solidification range; in these cases, the second component may be added in an amount up to 30% by weight. Other mixtures which have given favorable results comprise saturated polyesters, such as polyethyleneterephthalate or polybutyleneterephthalate, together with Polyamide 6, PA 11, PA 12 or copolyamides. The fiber-forming process and the quality of the product can be improved if such polyblends are additionally cross-linked as they are processed.

The use of pure polypropylene (PP) having an MFI at 190/5 of 20 normally results in a fiber having a thickness of, e.g., 10 microns. The addition of Polyamide 12 results in increasingly thinner fibers until the proportion of PA 12 is so large that a structure like that of cotton-wool is obtained.

Inorganic substances, such as fillers and dyestuffs or additives have a high thermal conductivity, when used in the polymer layer accelerate solidification during the formation of fibers. In most cases, such fibers tear off sooner. In the process according to the invention the use of such substances in a concentration up to 50% by weight is facilitated by the use of polymers having a low melt viscosity.

An important feature of the process of the invention is that the polymer residues are deflected by at least 5° and at most 90° from their direction. The degree of deflection of the carrier is chosen mainly by consideration of the nature of the polymer and of the desired quality of the product. Where mainly linear polymers are used, a larger angle of deflection is preferred than with branched polymers. Optimum results are to be expected if, in the processing of polyolefins (other than low density polyethylene), the angles of deflection lie between 30° and 80° whereas in the processing of low density polyethylene they should lie in a range between 10° and 60°. In the processing of saturated linear polyesters, the selected angles lie within the range of 50° and 80° and in the processing of cellulose acetate and cellulose acetate/butyrate, this selected range is between 20° and 60°. Polyblends can be processed with good results if the angle of deflection, also known as the drawing angle, is at least 80°.

The polymer film is supplied to the fiber-forming region at a temperature which is above, and preferably considerably above, its melting point; i.e., at a temperature of 10°–200° C. above the melting point. This temperature melts the polymers closest to the melting zone.

Another feature is that, for example, a small soft mass of polyamide in which there are wads of polyethylene or polyamide 6.6 which is compressed with polymethylmethacrylate, can be used in the invented process.

DESCRIPTION OF PREFERRED EMBODIMENT

Figure 1:
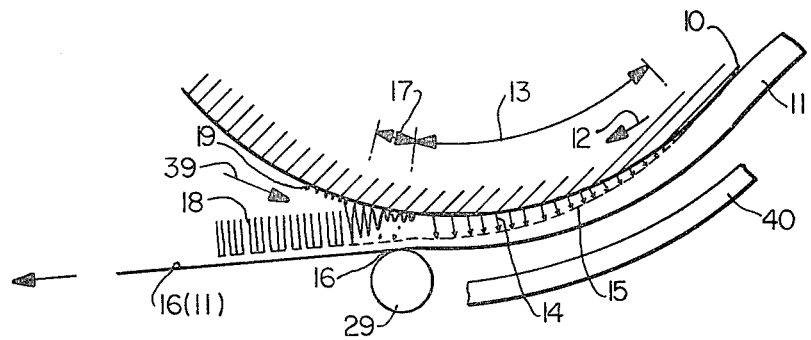
FIG. 1 is a magnified representation of the fiber drawing process in which a single film has been applied.

FIG. 1 represents a heatable drum or drawing surface 10. The drawing surface moves in the direction of the arrow 12. The polymer film 11 runs first through a melting zone 13 in which it is melted as is indicated by the arrows 14 and the dotted lines 15. As was previously stated, no more than ⅔ of film 11 is permitted to be melted. The unmelted portion of film 11 is substrate 16. The polymer passes through this zone layerwise in a molten condition. The drawing surface 10 is heated above the melting point of the polymer. The substrate 16 is not melted. Next to the melting zone 13 is the actual fiber formation zone 17. At the beginning of this zone the film 11 shows a more solid consistency on the substrate 16 as the substrate is drawn away from the drawing surface 10 by the deflector 29 under simultaneous cooling. In the preferred embodiment, secondary cooling is used and is arranged as backside cooler 40, which acts to prevent the substrate 16 from completely melting and consequently breaking under the stress caused by drawing. By drawing away the substrate 16, the fibers 18 are formed on the proximate surface of substrate 16. These fibers are formed as a consequence of the temperature drop which resulted as the molten polymer was torn away from the heated drawing surface 10. By this means, individual torn points of the fibers 18 are formed on the drawing surface 10. After pulling away and deflecting the molten polymer and the substrate, a residue film 19 adheres upon the drawing surface 10. The deflector 29 is so constructed that it can simultaneously provide for cooling of the residual film. Also a cooling apparatus operates in the direction of arrow 39 directly inside the drawing angle between the film and the drawing surface. Through the cooling as indicated by arrow 39, the nascent fibers 18 are stabilized so that they form a continuing fiber coating on the substrate 16. The individual fibers 18 are firmly and durably bound with the substrate 16. The length and quality of the fibers 18 can be altered by adjusting the intensity of the cooling, by altering the deflecting angle, by changing the velocity of the drawing surface and by controlling the temperature of the drawing surface. Also contributing to the quality and the length of the fibers 18 are the cooling system and the drawing tension. Similarly, the depth of melting can be controlled, for example, by choosing the thickness of the layering. In order to obviate the problem of completely melting both the substrate and molten component, in practice one varies the depth of the layers which are passed through the melting zone.

Figure 2:
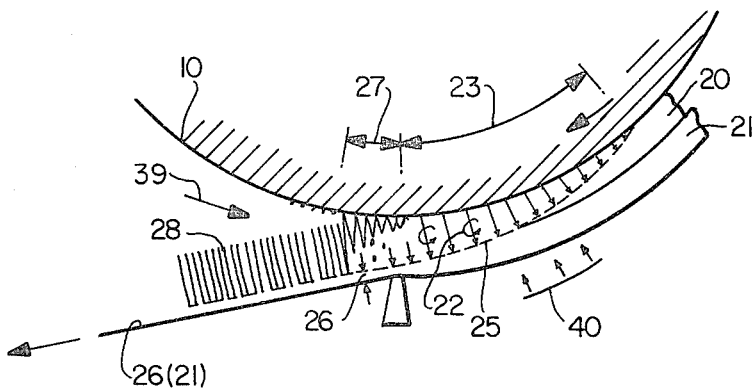
FIG. 2 shows the fiber drawing process with two films each respectively representing one of the two polymer layers of the composite film.

FIG. 2 shows two films, 20 and 21, which are present on the drawing surface 10. Films 20 and 21 may be different polymers or they may be polymer isomer which have different melting points or different melting viscosities. As is shown by the dotted line 25 which illustrates the depth of the melting, film 20 has completely melted in the melting zone 23, while there is still an unmelted residue of film 21, which is substrate 26. The melted polymer components are, for example, mixed with each other intensively through the influence of the shearing stress 22. In the fiber formation zone 27, a good union of both film polymers is achieved. Next, fibers 28 are formed. The properties of fibers 28 will be dependent on how much of the lower film 21 is melted and, therefore, mixed with the molten polymer of the upper film 20.

Figure 3:
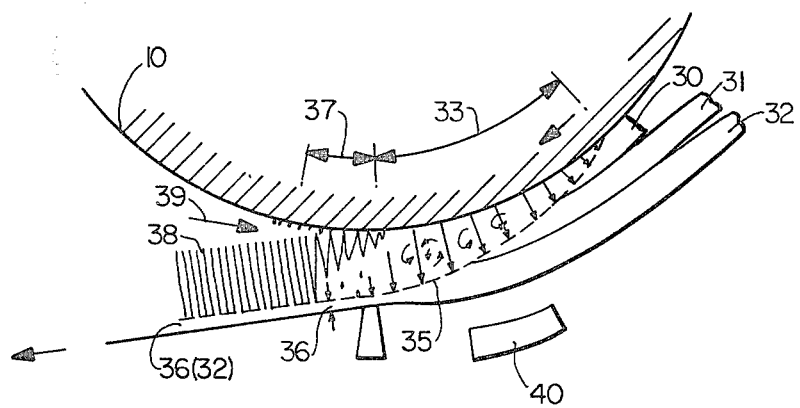
FIG. 3 shows the fiber drawing process with the application of three polymer layers.

FIG. 3 depicts a third modification. FIG. 3 shows the drawing surface 10 with 3 polymer films 30, 31 and 32, respectively. Three polymers, which could be different polymers, form one fiber because films 30 and 31 melt completely in the melting zone while a part of the third film 32 is melted. The substrate 36 is the unmelted residue of film 32. In the fiber formation zone 37, the mixed fibers 38 are drawn. The mixed fibers 38 consist of a polymer union of films 30 and 31. By adjusting the melting depth (see dotted line 35) one can achieve inclusion of a definite part of the third polymer film 32. Similarly, adjustments can be made which will preclude inclusion of any polymer film 32 in the polymer mixture (of layers 30 and 31) which will form the fibers. Such a process makes it possible to utilize special physical properties, such as adhesive or binding properties, of the component of film 32; such special qualities can be adjusted to meet the unique requirements of utility for special cases of application. A cooler which is used for the production of the fiber nap is indicated through the arrow 39. By using this cooler, immediate stabilization of the nascent fibers is assisted. The melting roller 10 can be replaced with another customary melting apparatus such as a heatable conveyor belt installation.

With the invented process, one can produce thermoplastic webs, substrates and sheets having fibrous surfaces; previously, this was not feasible. According to what was well-known in the prior art regarding the operation of processes of extrusions or spreading vent nozzles, blending could only be produced with difficulty if it could be produced at all.

The process of the invention is especially suitable for the production of new articles which could not be produced feasibly by the prior art. Polymer webs, substrates or sheets have always had a smooth glossy finish which was maximized by calendars which transformed the surfaces. According to the present invention, these foils, sheets and webs can be produced economically with velour, plush or pelt-like surfaces. Furthermore, these results can be produced out of one and the same meltable material in an economical process without the need of either any material in addition to the molten polymer component and the polymer substrate or more steps in the process.

Such a new material opens the previously-known film, sheets, and web materials to completely new possibilities. For example, this invention could be applied to decorated regions, pouched articles, floor, wall or ceiling overlays, for packaging, for outer clothing, for cars, power propelled vehicles, trailers, boat building, shoes and stuffed animals. Furthermore, numerous variations or after treatments can be made to the invented process such as stamping, shearing, embossing, friezing or printing.

This economical process of production by a systematic operation without the requirement of a non-polymeric material will have, for the seller, important favorable effects on the price structure. This effect will, of course, be important for a great volume of sales. A further important modification is the independence of the products produced by the claimed invention from the fiber market. Furthermore, another advantage is that the quality in form of the products of the present invention can be determined by the operator if he makes simple adjustments.

EXAMPLE 1

Using the apparatus is shown in FIG. 3, film 30 is polyamide 6 with a melting viscosity of 2.1 to 3.4, film 31 is polyethylene 190/2 from 10 to 300 g./10 minutes and film 32 is polyamide 6 with a melting viscosity of 2.1 to 3.4. The thickness of each film is 50 microns. Films 30 and 31 are supported by film 32 which acts as the substrate. Films 30 and 31 encircle the drawing surface 10 as film 32 is drawn. The melting zone 17 is on the drawing surface 10. Zone 17 includes the areas of the drum in which the temperature is about 240° C.—a temperature which is larger than the melting points of both polyamide 6 and polyethylene 190/2.

Film 30 is completely melted. The temperature is also in excess of the melting point of polyethylene 190/2; film 31 completely melts. A part of the substrate—film 32 (Polyamid 6)—is melted but not completely because of the use of a backside cooler 40. Therefore, film 32 melts only to a depth indicated by arrows 35. No more than ⅔ of film 32 is melted; melting more than ⅔ would risk breakage of the substrate because of drawing tension. Therefore, at least a 20 micron thickness of film 32 must remain unmelted. The depth of melting can be controlled for example by regulating the amount of heat transferred from the melting zone to the proximate solid film. Molten polymer still covers film 32. The deflector 29 guides film 32 and its covered surface away from the heated drawing surface. The nascent fibers are then stabilized by cooling air which is blown in the direction of arrow 39 from a cooler. The fibers are strongly attached to the polyamide 6 substrate. Finally, the fibrous product is removed from the apparatus.

What is claimed is:

1. A process for producing a self-supporting polymer substrate having a binary pile surface, comprising:
   (a) providing an unsupported composite film comprising a polymer of lower melting point upon a polymer of higher melting point, said polymer of higher melting point having a thickness of at least about 50 microns and being compatible with said polymer of lower melting point;
   (b) drawing the film past a heated drawing surface and through a melting zone;
   (c) heating the film in the melting zone by means of the heated drawing surface until the polymer of lower melting point and at least a portion of the thickness of the polymer of higher melting point become molten, at least a thickness of 20 microns of the polymer of higher melting point remaining unmelted, whereby the unmelted, part of the polymer of higher melting poing is a substrate which is covered with a film of the molten components; and
   (d) deflecting the substrate which is covered with the film of molten components from the drawing surface and the melting zone while simultaneously cooling the molten components, drawing the molten polymer having the lower melting point and a melted portion of the higher melting point polymer into binary fibers which are strongly bound to the surface of the substrate and which are a mixture of the polymer of lower melting point and polymer of higher melting point.

2. A process as recited in claim 1 in which a polymer of lower melting point is provided in the form of particulate matter.

3. A process as recited in claim 1 comprising cooling the back side of the polymer film, whereby complete melting of the polymer with a higher melting point is precluded.

4. A process for producing a self-supporting polymer substrate having a binary pile surface, comprising:
   (a) depositing simultaneously two or more different polymers, each with different melting points, upon a substrate polymer having a thickness of at least 50 microns, said polymers being mutually compatible.
   (b) drawing the deposited polymers and substrate past a heated drawing surface to melt said deposited polymers and at least a portion of the thickness of the substrate polymer;
   (c) deflecting the polymers from the drawing surface while simultaneously cooling the polymers;
   (d) forming nascent fibers from the cooling deposited polymers through means of stress said fibers being an intimate mixture of said deposited polymers and substrate polymer; and
   (e) stabilizing the fibers whereby strong bonds are formed between the fibers and the surface of the polymer with the higher melting point.

5. A process as recited in claim 4 comprising cooling the back side of the substrate.

6. A process as recited in claim 4 in which the polymers are deposited successively rather than simultaneously.

7. A process as recited in claim 4 in which differently colored polymers are applied.

8. A process as recited in claim 4 comprising applying shearing stress whereby molten components are mixed.

9. A process for making a self-supporting polymer substrate having a binary pile surface, comprising:
   (a) depositing a film of polyamide 6 having a thickness of at least 50 microns with a melting viscosity of 2.1 to 3.4 upon a film of polyethylene having an MFI at 190/2 of from 10 to 300 g./10 minutes and a thickness of at least 50 microns;
   (b) depositing further the polyamide 6 and polyethylene 190/2 films upon a film of polyamide 6 having a thickness of at least 50 microns with a melting viscosity of 2.1 to 3.4 whereby the polyethylene 190/2 film is between two polyamide 6 films;
   (c) drawing the films past a heated drawing surface and through a melting zone;
   (d) heating the films at a melting zone temperature of 240° C., by means of the heated drawing surface whereby the polyamide 6 film which is most distant from the drawing surface and melting zone is covered with a film of molten components after the 2 films closest to the melting zone are completely melted;
   (e) controllong the melting so that at least a portion of the thickness of the polyamide 6 film which is most distant from the drawing surface is melted, at least a thickness of 20 microns of the polyamide 6 film which is most distant from the drawing surface and melting zone remaining unmelted; and
   (f) deflecting part of the polyamide 6 film, which is not melted and is covered with the film of molten components, from the drawing surface and the melting zone while simultaneously cooling the molten components, drawing the polyethylene and a melted portion of said polyamide 6 into fibers which are a mixture of said polyamide 6 and polyethylene and strongly bound to the proximate surface of the unmelted part of the polyamide 6 film.

10. A process as recited in claim 9 in which the thickness of each of the films is 100 microns.

11. A process for producing unsupported polymer substrates having fibrous surfaces comprising:
   (a) depositing a film of polyamide 6 having a thickness of at least 50 microns with a melting viscosity of 2.1 to 3.4 upon a film of polyethylene having an MFI at 190/2 of from 10 to 300 g./10 minutes and a thickness of at least 50 microns;
   (b) depositing further the polyamide 6 and polyethylene 190/2 films upon a film of polyamide 6 having a thickness of at least 50 microns with a melting viscosity of 2.1 to 3.4 whereby the polyethylene 190/2 film is between two polyamide 6 films;
   (c) drawing the films past a heated drawing surface and through a melting zone;
   (d) heating the films at a melting zone temperature of 240° C., by means of the heated drawing surface whereby the polyamide 6 film which is most distant from the drawing surface and melting zone is covered with a film of molten components after the 2 films closest to the melting zone are completely melted;
   (e) controlling the melting whereby at least a portion of the thickness of the polyamide 6 film which is most distant from the drawing surface is melted, at least a thickness of 20 microns of the polyamide 6 film which is most distant from the drawing surface and melting zone remaining unmelted; and
   (f) deflecting part of the polyamide 6 film, which is not melted and is covered with the film of molten components, from the drawing surface and the melting zone while simultaneously cooling the molten components whereby fibers which are a mixture of said polyamide 6 and polyethylene are formed which are strongly bound to the proximate surface of the unmelted part of the polyamide 6 film.

* * * * *